United States Patent [19]

Kokai et al.

[11] Patent Number: 4,755,426
[45] Date of Patent: Jul. 5, 1988

[54] MAGNETIC RECORDING MEDIUM AND PRODUCTION OF THE SAME

[75] Inventors: Fumio Kokai, Palo Alto, Calif.; Minoru Ichijo, Toride; Kunio Wakai, Ibaraki, both of Japan

[73] Assignee: Hitachi Maxell, Ltd., Osaka, Japan

[21] Appl. No.: 3,287

[22] Filed: Jan. 14, 1987

[30] Foreign Application Priority Data

Jan. 18, 1986 [JP] Japan .................................. 61-8505
Jan. 24, 1986 [JP] Japan .................................. 61-12121

[51] Int. Cl.⁴ ........................... G11B 5/70; G11B 5/72
[52] U.S. Cl. ..................... 428/336; 427/131; 427/40; 427/41; 428/408; 428/694; 428/900
[58] Field of Search ............... 428/694, 900, 408, 40, 428/41, 336; 427/131

[56] References Cited

U.S. PATENT DOCUMENTS

| | | |
|---|---|---|
| 4,411,963 | 10/1983 | Aine ..................................... 427/131 |
| 4,503,125 | 3/1985 | Nelson et al. ........................ 427/131 |
| 4,596,735 | 6/1986 | Noguchi et al. ..................... 427/131 |
| 4,636,435 | 1/1987 | Yanagihara et al. ................ 427/131 |
| 4,643,915 | 2/1987 | Arai et al. ........................... 427/131 |
| 4,647,494 | 3/1987 | Meyerson et al. .................. 428/695 |

FOREIGN PATENT DOCUMENTS 2461997  3/1981  France ................................. 427/131

*Primary Examiner*—Paul J. Thibodeau
*Attorney, Agent, or Firm*—Birch, Stewart, Kolasch & Birch

[57] ABSTRACT

A magnetic recording medium which comprises a substrate, a magnetic layer on the substrate and a protective layer which is formed directly on the magnetic layer or on an undercoat layer formed on the magnetic layer, the protective layer comprising a carbonaceous material essentially consisting of carbon, hydrogen and oxygen, which has improved traveling properties and abrasion resistance.

14 Claims, 1 Drawing Sheet

MAGNETIC RECORDING MEDIUM AND PRODUCTION OF THE SAME

BACKGROUND OF THE INVENTION

1. Field of the Invention

The present invention relates to a magnetic recording medium and production of the same. More particularly, it relates to a magnetic recording medium with good traveling properties and durability and a process for producing the same.

2. Description of the Prior Arts

A magnetic layer is formed on a substrate of a magnetic recording medium by evaporating or sputtering ferromagnetic metal such as iron, cobalt and nickel or their alloy on a substrate film or by bonding magnetic powder together with a binder component to the substrate. When the magnetic recording medium is slid against a magnetic head during recording and reproducing informations, the magnetic layer tends to be abraded. Particularly, a ferromagnetic metal thin layer which has a large coefficient of friction against the magnetic head is easily abraded or damaged, although it has suitable characteristics for high density recording.

To overcome such a defect, it has been proposed and as well as having been the practice to provide various protective layers on the magnetic layer in order to decrease abrasion or damage caused by the magnetic head and to improve traveling properties of the magnetic recording medium. For example, Japanese Patent Kokai Publication No. 143206/1978 proposes application of a film comprising carbon atoms on the magnetic layer, and Japanese Patent Kokai Publication No. 127232/1984 proposes application of a carbonaceous thin layer containing diamond on the magnetic layer. Japanese Patent Kokai Publication No. 157725/1985 discloses a magnetic recording medium having a protective layer made of a cross linked hydrocarbon material with a specific carbon/hydrogen ratio and Japanese Patent Kokai Publication No. 157726/1985 discloses a process for producing such magnetic recording medium.

A magnetic recording medium having the protective layer comprising the carbonaceous material, however, does not have satisfactory traveling property since said protective layer has a large coefficient of dynamic friction and poor abrasion resistance. This is because the traveling property of the magnetic recording medium having the protective layer comprising the carbonaceous material is to a large extent influenced by contents of hydrogen and oxygen in the protective layer. Therefore, control of the hydrogen and oxygen contents is essential in the formation of such protective layer.

In addition, since the carbonaceous material layer has poor adhesivity to the magnetic layer, it is easily abrased in a short period of time and as a result the durability of the magnetic recording medium is not satisfactory.

SUMMARY OF THE INVENTION

One object of the present invention is to provide a magnetic recording medium comprising a protective layer which will impart improved traveling property to the magnetic recording medium Another object of the present invention is to provide a magnetic recording medium having improved abrasion resistance and durability.

These and other objects are accomplished by a magnetic recording medium which comprises a substrate, a magnetic layer on the substrate and a protective layer which is formed directly on the magnetic layer or on an undercoat layer formed on the magnetic layer, the protective layer comprising a carbonaceous material essentially consisting of carbon, hydrogen and oxygen.

DETAILED DESCRIPTION OF THE INVENTION

Figure 1:
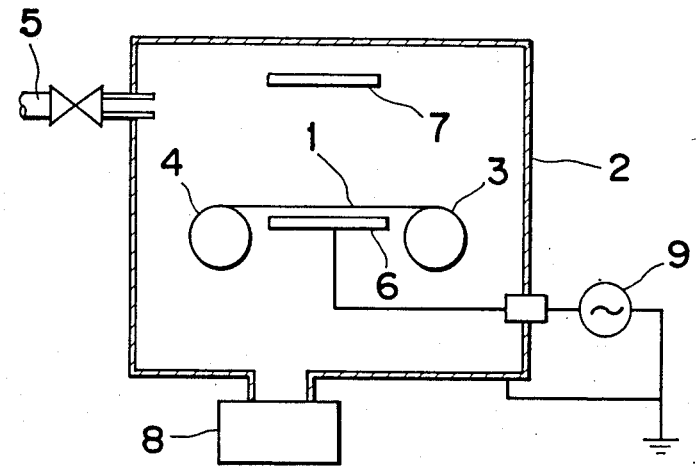
FIG. 1 schematically shows an apparatus for glow discharge used for forming an amorphous carbonaceous layer according to the present invention.

According to one aspect of the present invention, there is provided a magnetic recording medium which comprises a substrate, a magnetic layer on the substrate and a protective layer which is formed directly on the magnetic layer or on an undercoat layer formed on the magnetic layer, the protective layer comprising an amorphous carbonaceous layer essentially consisting of carbon, hydrogen and oxygen, in which an atomic ratio of carbon/hydrogen is in the range of 100/100 to 500/1 and an atomic ratio of carbon/oxygen is in the range of 100/100 to 1,000/1.

When the content of hydrogen atom or oxygen atom is greater than the above upper limit, the hardness of the protective layer decreases and in turn a coefficient of dynamic friction of the protective layer increases when the magnetic recording medium is slid against the magnetic head or a pin. When zero or small amounts of hydrogen or oxygen atom is contained in the protective layer, the layer becomes less flexible and more brittle and is easily peeled off to form flaws on the surface of the magnetic recording medium. A preferred atomic ratio of carbon/hydrogen is from 100/20 to 500/5, and that of carbon/oxygen is from 100/50 to 1,000/5.

The thickness of the protective layer of the present invention is from 50 Å to 1,000 Å, preferably from 50 Å to 300 Å. When the thickness of the protective layer is less than 50 Å, sufficient protective effect is not achieved. When it is larger than 1,000 Å, spacing loss increases.

According to the present invention, the amorphous carbonaceous protective layer can be formed by decomposition and polymerization of a gaseous hydrocarbon by glow discharge or by sputtering of carbonaceous materials such as graphite. The formation of the protective layer by glow discharge is explained by making reference to FIG. 1 which shows a glow discharge apparatus. A processing chamber 2 has a gas inlet tube 5 for introducing the gaseous hydrocarbon and an exhaust system 8 for maintaining an internal pressure of the chamber at specific pressure. The chamber 2 is also equipped with an upper electrode 7 and a lower electrode 6 between which a base film 1 made of, for example, polyester having the magnetic layer is traveled. Radiofrequency power is applied to the lower electrode at a specific power density to generate glow discharge. Thereby, the hydrocarbon is decomposed and polymerized on the magnetic layer to form the amorphous carbonaceous layer.

The contents of hydrogen and oxygen in the protective layer are controlled by adjusting the pressure of the gaseous hydrocarbon in the chamber in the range of 0.001 to 0.1 Torr. and applied power of radiofrequency per surface area of the lower electrode. Accordingly, when the pressure of the hydrocarbon is kept low in the above range and the radiofrequency power is applied at a high power density, the atomic ratio of carbon/hydrogen increases, and the atomic ratio of carbon/oxygen decreases. On the contrary, when the pressure of the hydrocarbon is kept high in the above range and the radiofrequency power is applied at a low power density, the atomic ratio of carbon/hydrogen decreases, and the atomic ratio of carbon/oxygen increases.

Examples of the hydrocarbon used for the formation of the amorphous carbonaceous protective layer according to the present invention includes saturated or unsaturated aliphatic hydrocarbons having 1 to 14 carbon atoms, aromatic hydrocarbons and mixtures thereof. Among them, methane, ethane, ethylene, propane, propylene and benzene are preferred. Also, a mixture of one or more of the hydrocarbons and other gases such as argon, helium, neon and hydrogen can be used.

The amorphous carbonaceous protective layer is formed directly on the magnetic layer, although a nonmagnetic undercoat layer may be provided between the magnetic layer and the protective layer. Such undercoat layer may be made of Au, Pt, Ni-P, Cr, Ni, $SiO_2$, SiTi, TiC, $Si_3N_4$ or an organic polymer.

According to another aspect of the present invention, there is provided a magnetic recording medium which comprises a substrate, a magnetic layer, a first protective layer made of a polymer comprising carbon, silicon and oxygen atoms formed on the magnetic layer and a second protective layer formed on the first protective layer and made of a carbonaceous material.

The application of the first protective layer improves adhesion of the carbonaceous second protective layer to the magnetic layer whereby durability and traveling property of the magnetic recording medium are improved. When the first protective layer made of the polymer is subjected to plasma treatment in an oxygen-containing atmosphere (pure oxygen or oxygen containing gas) so as to increase the content of oxygen near the surface of the first protective layer, adhesion of the carbonaceous second protective layer and the first protective layer is further improved.

The first protective layer made of the polymer is formed on the magnetic layer by plasma polymerization of an organic silicon monomer in a plasma generating apparatus by means of microwave, radiofrequency or glow discharge. Examples of the organic silicon monomer are tetramethylsilane, hexamethylsiloxane, hexamethyldisiloxane, hexamethyldisilane, hexamethylsilazane, octamethylcyclotetrasiloxane and the like. When the organic silicon monomer is subjected to microwave, radiofrequency or glow discharge, it forms radical species and reacts to form a polymer, which is deposited on the magnetic layer. The silicon monomer may be used as a single compound or as a mixture of two or more monomers. When the organic silicon monomer is carried in a carrier gas such as argon, helium or oxygen, it is carried on at a three to five time larger reaction rate than when the monomer alone is polymerized. A ratio of the carrier gas to the monomer is preferably from 1:1 to 1:20. When the amount of the carrier gas is too small, the reaction rate is not sufficiently increased. When it is too large, the monomer concentration becomes too low to maintain the polymerization. Particularly, when the plasma polymerization is carried out in the presence of oxygen, oxygen is contained throughout the polymer so that a cross-link density of the first protective layer is increased and adhesivity with the second protective layer is improved.

In plasma polymerization of the organic silicon monomer, as the pressure increases, the polymerization rate, namely the deposition rate, increases, while the produced polymer has less cross-link density so that a hard protective layer is not obtained. When the pressure is decreased and radiofrequency power is increased, a hard protective layer having high cross-link density is produced although the deposition rate is decreased. However, if the radiofrequency power is too high under low pressure, the monomer forms powder so that any protective layer is not formed. Preferably, the pressure is in the range of 0.001 to 5 Torr., and the radiofrequency power is in the range of 0.03 to 5 W/cm$^2$. More preferably, the pressure is in the range of 0.003 to 1 Torr., and the radiofrequency power is in the range of 0.05 to 3 W/cm$^2$. The thus formed first protective layer made of the polymer comprising the organic silicon monomer is dense and has a small coefficient of friction. Thereby, the abrasion resistance of the magnetic recording medium is increased. A thickness of the first protective layer is usually from 20 to 1,000 Å. When the thickness of the protective layer is too thin, the durability of the magnetic recording medium is not sufficiently improved. When it is too thick, spacing loss is increased so that recording/reproducing performance of the recording medium is adversely affected.

The substrate having the magnetic layer and the first protective layer is then subjected to the plasma treatment in a chamber containing plasma generated from oxygen gas or a gaseous mixture of oxygen and rare gas by means of a radiofrequency generator. In the plasma treatment, since the oxygen plasma has high energy, the surface of the first protective layer is effectively oxidized and the cross-link density near the surface is increased so as to provide the more dense and harder protective layer having a smaller coefficient of friction and improved abrasion resistance. Further, the oxidized surface of the first protective layer has better hydrophilicity and adhesivity. Therefore, when the carbonaceous protective layer is formed on such first protective layer, the former is more firmly adhered to the latter and decreases the coefficient of friction of the surface of the magnetic recording medium, whereby the traveling property and abrasion resistance of the medium are further improved.

By the plasma treatment of the first protective layer in the oxygen-containing atmosphere, the content of oxygen in the layer is preferably controlled such that a layer of 20 Å in depth from the surface contains 5 to 70% by weight of oxygen. Thereby, the first protective layer, particularly its surface region has a larger cross-link density and improved adhesivity with the carbonaceous second protective layer which is formed on the first protective layer. When oxygen is contained throughout the first protective layer, such properties are more improved. In such a case, oxygen is contained in a content of 5 to 50%, preferably 5 to 40% by weight in the whole first protective layer and in a content of 5 to 70% by weight in the layer of 20 Å in depth from the surface. The first protective layer made of the organic silicone polymer preferably contains the carbon and silicon atoms in amounts of 5 to 40% by weight and 10 to 50% by weight, respectively. When hydrogen is additionally contained in the organic silicone polymer, it is preferably contained in an amount of 2 to 20% by weight.

The plasma oxidation of the first protective layer oxidizes the surface of the protective layer and increases the cross-link density of the polymer particularly near the surface. Further, it increases adhesivity with the carbonaceous layer formed on the first protective layer. Preferably, the plasma oxidation of the first protective layer is carried out under oxygen pressure of 0.003 to 1 Torr. at a radiofrequency power density of 0.03 to 5 W/cm$^2$, more preferably under oxygen pressure of 0.01 to 0.5 Torr. at a radiofrequency power density of 0.05 to 3 W/cm$^2$.

On the thus formed first protective layer comprising the polymer which has been optionally plasma oxidized, the carbonaceous second protective layer is formed. Such carbonaceous layer is produced by sputtering or plasma CVD (chemical vapor deposition).

When sputtering is carried out in the presence of an inert gas such as argon and helium, a carbonaceous layer is deposited on the first protective layer by using a graphite target and radiofrequency power supply. Pressure of the inert gas and radiofrequency power are adjusted to optimize the deposition rate of the carbonaceous layer and simultaneously to prevent decomposition of the deposited carbonaceous layer. Preferably, the pressure is from 0.001 to 0.1 Torr. and the radiofrequency power is from 0.1 to 2 W/cm$^2$.

When plasma CVD is employed, the hydrocarbon such as methane, ethane, ethylene, benzene and the like is introduced in a chamber and subjected to radiofrequency power or glow discharge to decompose the hydrocarbon and generate plasma, whereby the carbonaceous layer is deposited on the first protective layer. Since plasma atmosphere contains hydrogen and oxygen atoms and water molecules, the carbonaceous layer contains small amounts of hydrogen and/or oxygen atoms. Preferably, the pressure of the hydrocarbon is from 0.001 to 0.01 Torr. and the radiofrequency power density is from 0.5 to 3 W/cm$^2$.

The thus formed carbonaceous layer has good adhesivity with the first protective layer made of the polymer comprising carbon, silicon and oxygen atoms and a small coefficient of friction. Therefore, the carbonaceous second protective layer increases the traveling property and the abrasion resistance of the magnetic recording medium.

The carbonaceous material forming the second protective layer may be any of diamond-like, graphite-like and amorphous carbon or a mixture thereof. The thickness of the carbonaceous protective layer is preferably from 10 to 400 Å, preferably 10 to 200 Å. When the thickness is smaller than 10 Å, durability of the magnetic recording medium is not improved. When it is larger than 400 Å, spacing loss is increased so that the recording/reproducing performance of the recording medium are adversely affected.

When the ferromagnetic layer comprising cobalt is thermally treated in the presence of water to form a water-containing oxide of trivalent cobalt on the surface of the ferromagnetic layer before two protective layers are formed, durability of the magnetic recording medium is further increased.

The magnetic layer is formed by applying a mixture of magnetic powder, a binder resin and an organic solvent on the substrate and drying it, or by applying ferromagnetic metal or alloy on the substrate by evaporating, ion plating, sputtering or plating. Examples of the magnetic powder are $\gamma$-Fe$_2$O$_3$ powder, Fe$_3$O$_4$ powder, cobalt-containing $\gamma$-Fe$_2$O$_3$ powder, cobalt-containing Fe$_3$O$_4$ powder, iron powder, cobalt powder, iron-cobalt alloy powder and the like. Examples of the ferromagnetic metal and alloy are cobalt, iron, nickel, cobalt-nickel alloy, cobalt-chromium alloy, cobalt-phosphorus alloy, cobalt-nickel-phosphorus alloy and the like. As the binder resin and the organic solvent, the ones used are those which are conventionally used.

The magnetic recording medium according to the present invention includes a magnetic tape comprising a substrate consisting of a film of a synthetic resin such as polyester and polyimide, a magnetic disc or drum comprising a disc or drum shape substrate made of the synthetic resin, aluminum or glass.

The present invention will be explained further in detail by following examples.

EXAMPLE 1

The glow discharge apparatus shown in FIG. 1 was used. A polyester film 1 on which a ferromagnetic metal thin layer 10 of cobalt having a thickness of 1,000 Å was formed was traveled from a supply roll 3 to a winder roll 4 at a rate of 3 m/min. in a chamber 2. Methane gas was supplied from an inlet tube 5 at a flow rate of 10 sccm to keep pressure at 0.005 Torr. By applying radiofrequency power of 13.56 MHz to a lower electrode 6 at a power density of 1 W/cm$^2$ to generate glow discharge. Thereby, an amorphous carbonaceous layer having a thickness of 120 Å was formed on the metal thin layer 10.

Figure 2:
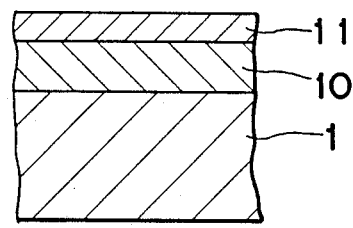
FIGS. 2, 3 and 4 are cross sectional views of the magnetic recording tapes according to the present invention.

Then, the film was cut to form a magnetic recording tape having a cross section as shown in FIG. 2, which consisted of the polyester film 1, the ferromagnetic metal thin layer 10 and an amorphous carbonaceous protective layer 11.

The amorphous carbonaceous layer was analyzed by FT-IR (Fourier transformation infrared spectroscopy) and ESCA to find that the atomic ratio of carbon/hydrogen was 100/2 and that of carbon/oxygen was 100/1.

EXAMPLE 2

In the same manner as in Example 1 but supplying ethylene gas at a flow rate of 15 sccm in place of methane, a magnetic recording medium comprising an amorphous carbonaceous protective layer having a thickness of 200 Å was produced. According the same analyses as in Example 1, the carbonaceous layer had a carbon/hydrogen atomic ratio of 1,000/13 and a carbon/oxygen atomic ratio of 100/1.

EXAMPLE 3

Figure 3:
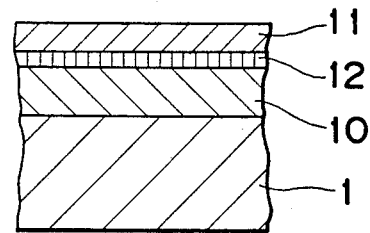

In the same manner as in Example 1 but supplying tetramethylsilane (Si(CH$_3$)$_4$) at a flow rate of 50 sccm in place of methane under pressure of 0.05 Torr. and applying radiofrequency power of 13.56 MHZ to the lower electrode 6 at a power density of 0.3 W/cm$^2$ to generate glow discharge, an intermediate plasma polymerized layer 12 having a thickness of 40 Å was formed on the ferromagnetic metal thin layer 10. Then, an amorphous carbonaceous layer was formed in the same manner as in Example 1 but traveling the film 1 from the roll 4 to the roll 3. Then, the film was cut to form a magnetic recording tape having a cross section as shown in FIG. 3 which consisted of the substrate film 1, the ferromagnetic metal thin layer 10, the intermediate layer 12 and the amorphous carbonaceous layer 11. The thickness of the carbonaceous layer was 120 Å. According the same analyses as in Example 1, the carbonaceous layer had a carbon/hydrogen atomic ratio of 100/2 and a carbon/oxygen atomic ratio of 100/1.

COMPARATIVE EXAMPLE 1

In the same manner as in Example 1 but applying radiofrequency power at a power density of 1.5 W/cm$^2$, a magnetic recording tape was produced. The thickness of the amorphous carbonaceous layer was 100 Å. According the same analyses as in Example 1, the carbonaceous layer had a carbon/hydrogen atom ratio of 1,000/1 and a carbon/oxygen atomic ratio of 100/2.

COMPARATIVE EXAMPLE 2

In the same manner as in Example 1 but keeping the pressure of methane at 0.02 Torr., a magnetic recording tape was produced. The thickness of the amorphous carbonaceous layer was 400 Å. According the same analyses as in Example 1, the carbonaceous layer had a carbon/hydrogen atomic ratio of 100/100 and a carbon/oxygen atomic ratio of 100/50.

Coefficients of dynamic friction and abrasion resistance of the magnetic recording tapes produced in Examples 1-3 and Comparative Examples 1-2 were measured as follows:

Coefficient of dynamic friction

The magnetic recording tape was slid against a stainless pin (a fixed cylindrical pin) at a relative rate of 1 m/sec. and tension was measured. A coefficient of dynamic friction was calculated from said tension.

Abrasion resistance

The magnetic recording tape was reciprocated with slidingly contacting to a stainless pin. Abrasion resistance was evaluated in terms of the number of sliding motions till the amorphous carbonaceous layer was damaged.

The results are shown in Table 1.

TABLE 1

| Example No. | Coefficient of dynamic friction | Number of sliding motions (times) |
|---|---|---|
| 1 | 0.28 | 3,730 |
| 2 | 0.23 | 3,850 |
| 3 | 0.28 | 4,300 |
| Comp. 1 | 0.35 | 1,320 |
| Comp. 2 | 0.45 | 1,540 |

As understood from the above results, the magnetic recording tapes of the present invention had smaller coefficients of dynamic coefficient and larger number of sliding motions, namely better abrasion resistance than those produced in Comparative Examples. This means that the magnetic recording tapes of the present invention have greatly improved traveling property. The magnetic recording tape produced in Example 3 which had the intermediate layer had further improved abrasion resistance and traveling property since the intermediate layer increases the adhesivity of the amorphous carbonaceous layer.

EXAMPLE 4

Figure 4:
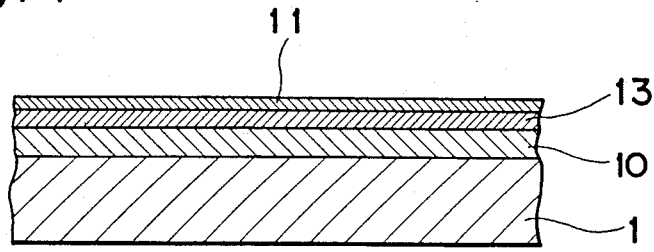

A polyester film having a thickness of 10 μm was installed in a vacuum evaporating apparatus. Then, cobalt was heated to vaporize and deposited on the film to form a ferromagnetic metal layer having a thickness of 1,000 Å. Thereafter, tetramethylsilane was plasma polymerized on the polyester film having the cobalt layer by means of the apparatus of FIG. 1 as follows:

The polyester film was traveled from the supply roll 3 to the winder roll 4 at a rate of 5 m/min. Tetramethylsilane was supplied from the inlet tube 5 at a flow rate of 100 sccm under pressure of 0.03 Torr. Simultaneously, radiofrequency power was applied to the lower electrode 6 at a power density of 0.5 W/cm$^2$ to plasma polymerize tetramethylsilane to form a polymer protective layer having a thickness of 50 Å on the ferromagnetic layer formed on the polyester film. Then, the film was reversed from the roll 4 to the roll 3 at a rate of 1 m/min. Simultaneously, methane gas was supplied from the inlet tube 5 at a flow rate of 50 sccm under pressure of 0.005 Torr. and radiofrequency was applied to the lower electrode 6 at a power density of 1 W/cm$^2$ to form a carbonaceous protective layer having a thickness of 50 Å by plasma CVD. Then, the film was cut to produce a magnetic recording tape having a predetermined width and a cross section as shown in FIG. 4 which consisted of the polyester film 1, the ferromagnetic metal layer 10, the polymer protective layer 13 and the carbonaceous protective layer 11.

EXAMPLE 5

In the same manner as in Example 4 except that, between the formation of the polymer protective layer and the carbonaceous protective layer, radiofrequency power was applied to the lower electrode 6 at a power density of 0.5 W/cm$^2$ with supplying oxygen gas from the inlet tube 5 at a flow rate of 200 sccm under pressure of 0.06 torr. for plasma treatment of the polymer protective layer, the magnetic recording tape was produced.

EXAMPLE 6

Following components were mixed in a ball mill for 72 hours to prepare a magnetic paint:

| Component | Parts by weight |
|---|---|
| α-Fe magnetic powder | 600 |
| Vinyl chloride-vinyl acetate copolymer (Esleck CN manufactured by Sekisui Chemical) | 80 |
| Urethane elastomer (Pandex T-5250 manufactured by Dainippon Ink Chemical) | 30 |
| Trifunctional low molecular weight isocyanate compound (Colonate L manufactured by Nippon Urethane industries) | 10 |
| Methyl isobutyl ketone | 400 |
| Toluene | 400 |

The magnetic paint was applied on a polyester film having a thickness of 10 μm and dried to form a magnetic layer having a thickness of 4 μm after drying. On the polyester film having the thus formed magnetic layer, a polymer protective layer and a carbonaceous protective layer were formed and a magnetic recording tape was produced in the same manner as in Example 4.

EXAMPLE 7

In the same manner as in Example 4 except that, after forming the ferromagnetic metal layer of cobalt, the polyester film was removed from the chamber 2 and thermally treated in a heating chamber kept at 60° C., 30%RH under atmospheric pressure for 3 hours, a magnetic recording tape was produced.

COMPARATIVE EXAMPLE 3

In the same manner as in Example 4 but eliminating the formation of the polymer protective layer and the carbonaceous protective layer, a magnetic recording tape was produced.

COMPARATIVE EXAMPLE 4

In the same manner as in Example 4 but eliminating the formation of the carbonaceous protective layer, a magnetic recording tape was produced.

Coefficients of dynamic friction and abrasion resistance of the magnetic recording tapes produced in Examples 4-7 and Comparative Examples 3-4 were measured in the same manner as in the above. The results are shown in Table 2.

TABLE 2

| Example No. | Coefficient of dynamic friction | Number of sliding motions (times) |
|---|---|---|
| 4 | 0.25 | 5,500 |
| 5 | 0.23 | 6,750 |
| 6 | 0.25 | 6,530 |
| 7 | 0.25 | 7,530 |
| Comp. 3 | 0.45 | 500 |
| Comp. 4 | 0.33 | 2,550 |

As apparent from the above results, the magnetic recording tapes produced in Examples 4-7 had smaller coefficients of dynamic coefficient and larger number of sliding motions, namely better abrasion resistance than those produced in Comparative Examples 3 and 4. This means that the magnetic recording tapes of the present invention have greatly improved traveling property and durability.

What is claimed is:

1. A magnetic recording medium comprising a substrate, a magnetic layer on the substrate and a protective layer which is formed directly on the magnetic layer, said protective layer comprising an amorphous carbonaceous layer consisting essentially of carbon, hydrogen and oxygen, in which an atomic ratio of carbon/hydrogen is in the range of 100/100 to 500/1 and an atomic ratio of carbon/oxygen is in the range of 100/100 to 1,000/1.

2. The magnetic recording medium according to claim 1, wherein the atomic ratio of carbon/hydrogen is in the range of 100/20 to 500/5 and the atomic ratio of carbon/oxygen is in the range of 100/50 to 1,000/5.

3. The magnetic recording medium according to claim 1, wherein the thickness of the amorphous carbonaceous layer is from 50 to 1,000 Å.

4. A magnetic recording medium comprising a substrate, a magnetic layer, a first protective layer made of a polymer comprising carbon, silicon and oxygen atoms formed on the magnetic layer and a second protective layer formed on the first protective layer and made of a carbonaceous material.

5. The magnetic recording medium according to claim 4, wherein the content of oxygen in the first protective layer increases toward the surface on which the second protective layer is formed.

6. A method for producing a magnetic recording medium which comprises a substrate, a magnetic layer, a first protective layer made of a polymer comprising carbon, silicon and oxygen atoms formed on the magnetic layer and a second protective layer formed on the first protective layer and made of a carbonaceous material, which method comprises steps of forming a magnetic layer on a substrate, plasma polymerizing an organic compound comprising carbon, silicon and oxygen atoms to form a first protective layer made of a polymer comprising carbon, silicon and oxygen atoms on the magnetic layer, and forming a carbonaceous second protective layer on the first protective layer.

7. The method according to claim 6, which further comprises a step of plasma treating the first protective layer, before the carbonaceous second protective layer is formed, in an oxygen-containing atmosphere, whereby the oxygen content in said protective layer increases toward its surface.

8. A magnetic recording medium comprising a substrate, a magnetic layer on the substrate, an undercoat layer formed on the magnetic layer and a protective layer formed on the undercoat layer, wherein the protective layer comprises an amorphous carbonaceous layer consisting essentially of carbon, hydrogen and oxygen, in which an atomic ratio of carbon/hydrogen is in the range of 100/100 to 500/1 and an atomic ratio of carbon/oxygen is in the range of 100/100 to 1,000/1.

9. The magnetic recording medium according to claim 8, wherein the undercoat layer comprises at least one material selected from the group consisting of Au, Pt, Ni-P, Cr, Ni, $SiO_2$, SiTi, TiC, $Si_3N_4$ and an organic polymer.

10. The magnetic recording medium according to claim 9, wherein the undercoat layer comprises an organic polymer, in which said organic polymer is a plasma polymerized organic material.

11. The magnetic recording medium according to claim 10, wherein the undercoat layer comprises an organic polymer comprising carbon, silicon and oxygen atoms.

12. The magnetic recording medium according to claim 11, wherein the content of oxygen in the undercoat layer increases toward the surface on which the amorphous carbonaceous layer is formed.

13. The magnetic recording medium according to claim 8, wherein the atomic ratio of carbon/hydrogen is in the range of 100/20 to 500/5 and the atomic ratio of carbon/oxygen is in the range of 100/50 to 1,000/5.

14. The magnetic recording medium according to claim 8, wherein the thickness of the amorphous carbonaceous layer is from 50 to 1,000 Å.

* * * * *